(12) United States Patent
Maruyama et al.

(10) Patent No.: US 9,480,201 B2
(45) Date of Patent: Nov. 1, 2016

(54) LAWN MOWER

(71) Applicant: HONDA MOTOR CO., LTD., Tokyo (JP)

(72) Inventors: Shuhei Maruyama, Wako (JP); Hiroshi Kobayashi, Wako (JP); Kenzo Shimada, Wako (JP); Ryuichi Kimata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 72 days.

(21) Appl. No.: 13/761,572

(22) Filed: Feb. 7, 2013

(65) Prior Publication Data

US 2013/0205736 A1  Aug. 15, 2013

(30) Foreign Application Priority Data

Feb. 10, 2012 (JP) .................................. 2012-027632

(51) Int. Cl.
*A01D 46/00* (2006.01)
*A01D 34/82* (2006.01)
(Continued)

(52) U.S. Cl.
CPC .............. *A01D 34/82* (2013.01); *A01D 34/73* (2013.01); *B60L 1/003* (2013.01); *B60L 3/04* (2013.01); *B60L 11/1805* (2013.01); *B60L 11/1816* (2013.01); *B60L 11/1824* (2013.01); *B60L 11/1827* (2013.01); *B60L 11/1861* (2013.01); *B60L 11/1877* (2013.01); *B60L 15/2036* (2013.01); *A01D 34/008* (2013.01); *A01D 34/736* (2013.01); *A01D 34/78* (2013.01); *B60L 2200/40* (2013.01); *B60L 2210/30* (2013.01);
(Continued)

(58) Field of Classification Search
CPC ..................................................... A01D 34/733
USPC ............ 56/17.5, 255, 295, DIG. 19, DIG. 20
See application file for complete search history.

(56) References Cited

U.S. PATENT DOCUMENTS 2,529,870 A * 11/1950 Golasky ................. A01D 34/63
56/17.2
2,547,540 A 4/1951 Roberts
(Continued)

FOREIGN PATENT DOCUMENTS

| AU | 20041 70 | 3/1972 |
|----|----------|--------|
| DE | 8716660.7 U1 | 3/1988 |

(Continued)

OTHER PUBLICATIONS

European Search Report dated Jun. 17, 2013, Application No. 13154127.8, 4 pages.

(Continued)

*Primary Examiner* — Robert Pezzuto
*Assistant Examiner* — Mai Nguyen
(74) *Attorney, Agent, or Firm* — Rankin, Hill & Clark LLP

(57) ABSTRACT

In a lawn mower for mowing lawns on a ground having a drive shaft adapted to transmit a rotational driving force of a operating motor (prime mover), three blades and a connecting member having a blade disk adapted to connect the blades with the drive shaft, a fan is integrally formed at the connecting member. The blades are attached to the connecting member at a circumference of the connecting member and to be movable relative to the connecting member in a radial direction of the connecting member.

5 Claims, 6 Drawing Sheets

(51) Int. Cl.
*A01D 34/73* (2006.01)
*B60L 1/00* (2006.01)
*B60L 3/04* (2006.01)
*B60L 11/18* (2006.01)
*B60L 15/20* (2006.01)
*A01D 34/00* (2006.01)
*A01D 34/78* (2006.01)

(52) U.S. Cl.
CPC ......... *B60L 2220/44* (2013.01); *B60L 2240/12* (2013.01); *B60L 2240/22* (2013.01); *B60L 2240/421* (2013.01); *B60L 2240/423* (2013.01); *B60L 2240/461* (2013.01); *B60L 2240/547* (2013.01); *B60L 2240/549* (2013.01); *B60L 2250/16* (2013.01); *B60L 2260/28* (2013.01); *B60L 2260/32* (2013.01); *Y02T 10/645* (2013.01); *Y02T 10/7005* (2013.01); *Y02T 10/705* (2013.01); *Y02T 10/7044* (2013.01); *Y02T 10/7072* (2013.01); *Y02T 10/7241* (2013.01); *Y02T 10/7275* (2013.01); *Y02T 90/121* (2013.01); *Y02T 90/125* (2013.01); *Y02T 90/127* (2013.01); *Y02T 90/14* (2013.01)

(56) References Cited

U.S. PATENT DOCUMENTS

| | | | | |
|---|---|---|---|---|
| 2,859,582 A * | 11/1958 | Babcock | ............ | A01D 34/733 56/295 |
| 3,080,697 A * | 3/1963 | Mauro | ............ | 56/295 |
| 3,097,469 A * | 7/1963 | Belfiore | ............ | 56/295 |
| 3,184,907 A * | 5/1965 | Harloff | ............ | A01D 34/63 56/295 |
| 3,217,812 A * | 11/1965 | Gallion | ............ | 172/16 |
| 3,320,732 A * | 5/1967 | Kirk | ............ | 56/295 |
| 3,336,737 A * | 8/1967 | Belfiore | ............ | 56/295 |
| 3,392,515 A * | 7/1968 | Plous | ............ | 56/295 |
| 3,500,622 A * | 3/1970 | Bowen | ............ | 56/295 |
| 3,690,051 A * | 9/1972 | Wood | ............ | 56/295 |
| 3,974,630 A * | 8/1976 | van der Lely | ............ | A01D 34/664 56/13.6 |
| 4,083,166 A | 4/1978 | Haas | | |
| 4,114,354 A * | 9/1978 | Morris | ............ | A01D 34/6806 56/295 |
| 4,214,426 A * | 7/1980 | Lindblad | ............ | 56/295 |
| 4,257,214 A * | 3/1981 | Ferguson | ............ | A01D 34/73 56/13.4 |
| 4,369,618 A * | 1/1983 | Dell | ............ | 56/295 |
| 4,407,112 A * | 10/1983 | Shepherd et al. | ............ | 56/13.4 |
| 4,513,563 A * | 4/1985 | Roser et al. | ............ | 56/295 |
| 4,924,665 A | 5/1990 | Crosley | | |
| 5,274,987 A * | 1/1994 | Wiener | ............ | A01D 34/001 192/50 |
| 5,626,008 A * | 5/1997 | Puszkar | ............ | 56/17.5 |
| 6,026,635 A * | 2/2000 | Staiger | ............ | 56/295 |
| 6,101,794 A * | 8/2000 | Christopherson et al. | ............ | 56/6 |
| 2010/0257832 A1 | 10/2010 | Smith | | |

FOREIGN PATENT DOCUMENTS

| | | |
|---|---|---|
| DE | 29908940 U1 | 8/1999 |
| JP | 61-136836 | 8/1986 |
| WO | 2010/142009 A1 | 12/2010 |
| WO | 2011/154557 A1 | 12/2011 |

OTHER PUBLICATIONS

European Office Action dated Mar. 12, 2014, 4 pages.

* cited by examiner

LAWN MOWER

BACKGROUND

1. Technical Field

Embodiments of the invention relate to a lawn mower, particularly to a lawn mower whose mowing performance is improved with the use of lawn-mowing blades.

2. Background Art

Conventionally, a variety of lawn mowers are proposed in which a drive shaft adapted to transmit a rotational driving force of a prime mover (e.g., electric motor, etc.) is connected to blades through a connecting member so that the blades and connecting member are rotated about the drive shaft to mow lawn on the ground surface, as taught, for example, by Japanese Laid-Open Utility Model Application No. Sho 61 (1986)-136836.

In the reference, the blades (i.e., a kind of movable blades) are attached at the circumferential edge of the disk-shaped connecting member to be able to swing, and a centrifugal force generated through the rotation of the connecting member makes the blades rotate together with the connecting member while making them project outward in a radial direction, thereby mowing lawn.

Meanwhile, in the case where lawn grass on the ground lies down, the mowing performance of the lawn mower should preferably be improved by lifting up the lying grass to be cut with a lawn mower. Consequently, in the reference, an end of the blade is bent or curved upward from one side formed with a cutting part toward the rear side in a rotating direction, i.e., a bending portion is formed at the end of the blade, so that, when the blade is rotated, negative pressure is generated at a bottom surface of the bending portion. As a result, a resulting stream of air works to lift up the lying grass and it helps the lawn mower cut the grass.

SUMMARY

However, when a part of the blade is simply bent to form the bending portion as stated in the foregoing, it may not be enough to have a sufficient stream of air for lifting up the lying grass. Although one measure to cope with it is to bend the bending portion more to increase the negative pressure, it also increases resistance acting on the blade that is being rotated and accordingly, the blade projecting with the aid of the centrifugal force is to be moved backward, i.e., in the opposite direction from the rotating direction. It means that the blade is rotated at an angle with which the lying grass is not easily cut by the blade, resulting in deterioration in the mowing performance.

An object of embodiments of the invention is therefore to overcome the foregoing drawback by providing a lawn mower that can lift up lying grass through rotation of blades and cut the lifted grass, thereby improving the mowing performance.

In order to achieve the object, the embodiments of the invention provide a lawn mower for mowing lawns on a ground having a drive shaft adapted to transmit a rotational driving force of a prime mover, a blade and a connecting member adapted to connect the blade with the drive shaft, wherein the improvement comprises: a fan is integrally formed at the connecting member.

BRIEF DESCRIPTION OF DRAWINGS

The above and other objects and advantages will be more apparent from the following description and drawings in which.

DESCRIPTION OF EMBODIMENTS

A lawn mower according to embodiments of the present invention will now be explained with reference to the attached drawings.

Figure 1:
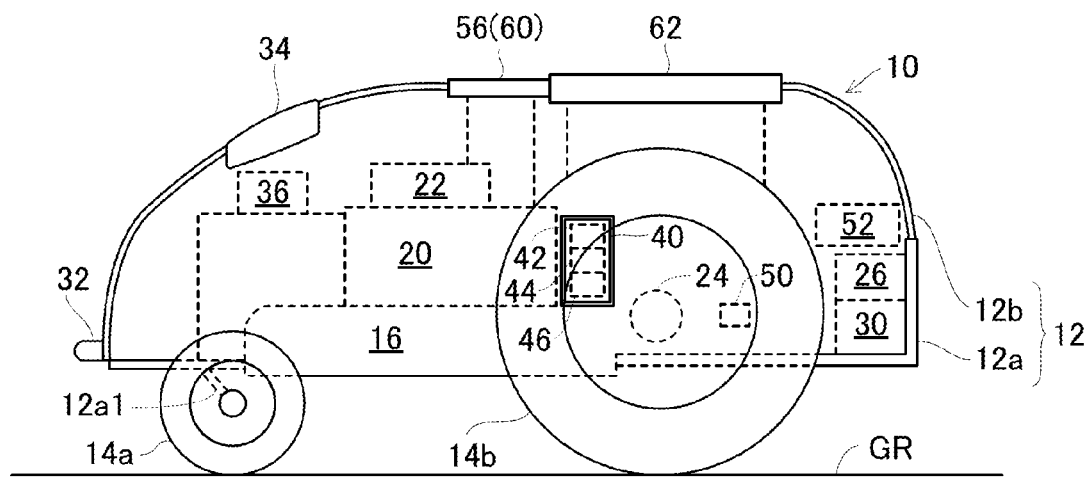
FIG. 1 is a side view of a lawn mower according to a first embodiment of the invention.
Figure 2:
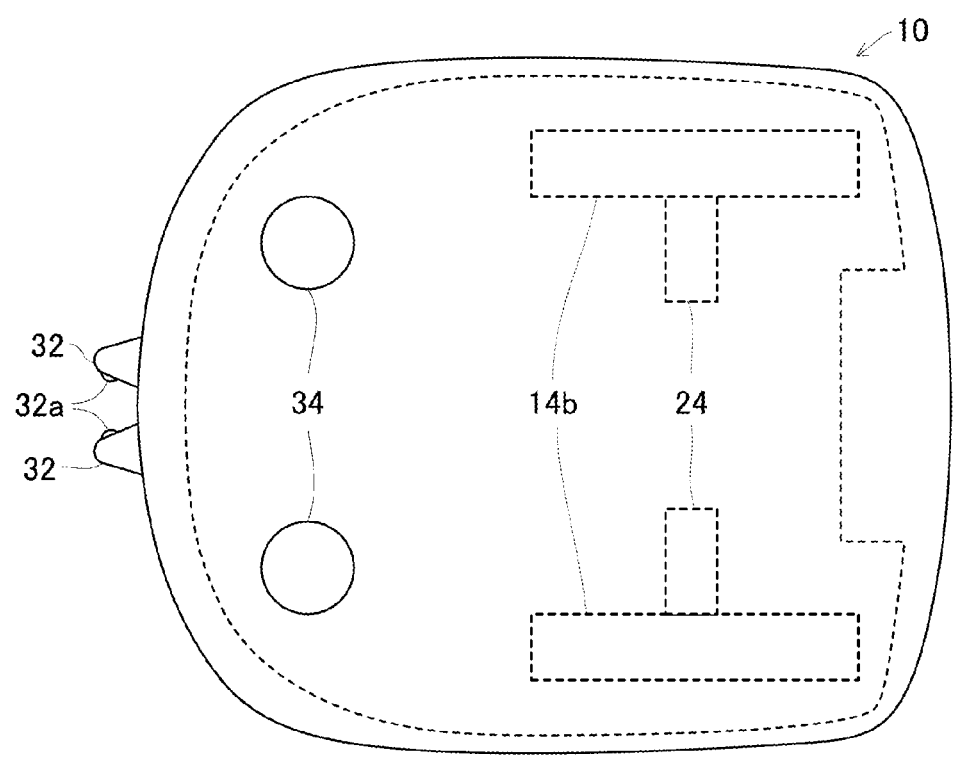
FIG. 2 is a plan view of the lawn mower shown in FIG. 1.
Figure 3:
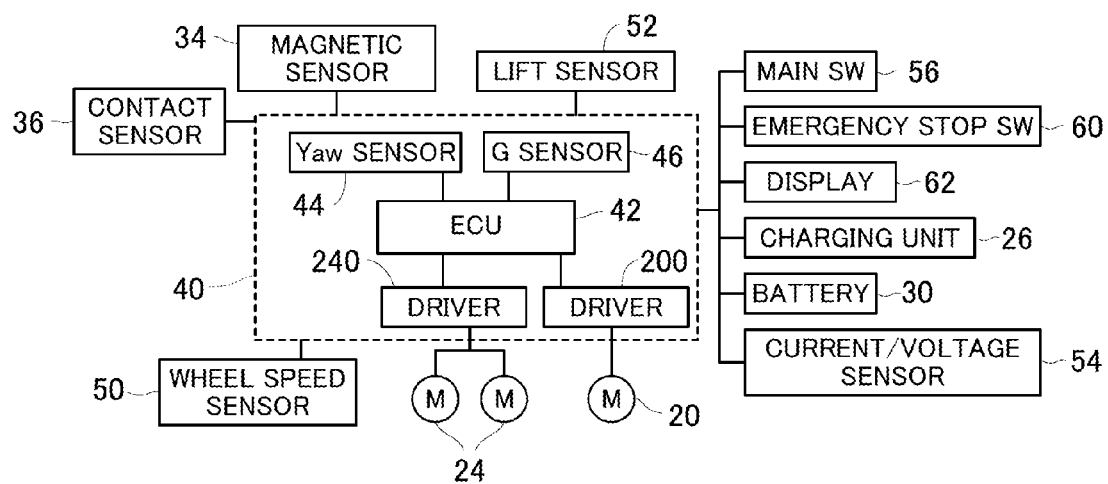
FIG. 3 is a block diagram showing input and output of devices mounted on the lawn mower shown in FIG. 1.
Figure 4:
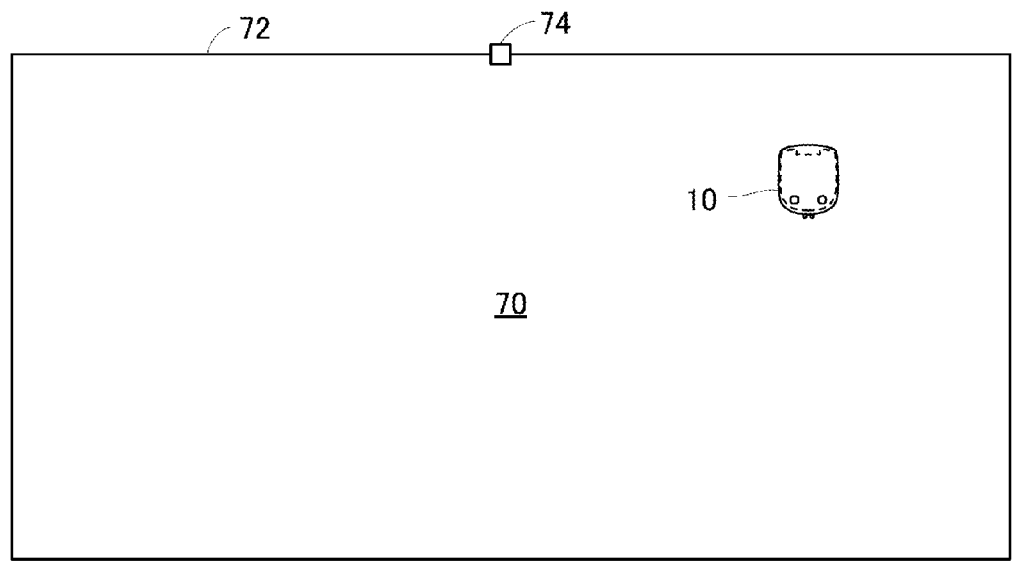
FIG. 4 is a plan view showing an operating area where the lawn mower shown in FIG. 1 is to run about.

FIG. 1 is a side view of a lawn mower according to a first embodiment of the invention, FIG. 2 is a plan view of the lawn mower, FIG. 3 is a block diagram showing input and output of devices mounted on the lawn mower and FIG. 4 is a plan view showing an operating area where the lawn mower is to run about.

As shown in FIGS. 1 and 2, symbol 10 indicates a lawn mower (unmanned autonomous operating vehicle). The lawn mower 10 has a vehicle body 12 and wheels 14. The body 12 includes a chassis 12a and a frame 12b attached to the chassis 12a, while the wheels 14 include right and left front wheels 14a of a relatively small diameter that are fixed on the forepart of the chassis 12a through a stay 12a1, and right and left rear wheels 14b of a relatively large diameter that are directly attached to the chassis 12a.

Blades (rotary blades; operating machine) 16 for mowing lawn are attached in the center or thereabout of the chassis 12a, and an electric motor (prime mover; hereinafter called the "operating motor") 20 is installed above the blades 16. The blades 16 are connected to the operating motor 20 to be driven and rotated thereby. The connection between the blades 16 and operating motor 20 will be explained later in detail.

The blades 16 are also connected to a blade height adjustment mechanism 22 to be manually manipulated by an operator (user). The blade height adjustment mechanism 22 is equipped with a screw (not shown) to be manually turned by the operator for adjusting the height of the blades 16 from a contacting ground GR.

Two electric motors (prime movers; hereinafter called the "running motors") 24 are attached to the chassis 12a of the lawn mower 10 to the rear of the blades 16. The running motors 24 are connected to the right and left of the rear wheels 14b to operate them so that the rear wheels 14b are rotated in the normal (forward running) direction or reverse (backward running) direction independently of each other to make the lawn mower 10 to run about the ground GR. In other words, the front wheels 14a serve as the free wheels while the rear wheels 14b serve as the driven wheels. The operating motor 20, running motors 24, etc., are covered by the frame 12b and the blades 16, etc., are accommodated in a blade housing (not shown in FIGS. 1 and 2) in the frame 12b.

A charging unit (including an AC/DC converter) 26 and battery 30 are accommodated at the rear of the lawn mower 10 and two charging terminals 32 are attached on the frame 12b to protrude forward. Each of the terminals 32 has a contact point 32a on a side facing the other contact point 32a.

The terminals 32 are connected to the charging unit 26 through wiring and the charging unit 26 is connected to the battery 30 through wiring. The operating and running motors 20, 24 are connected to the battery 30 through wiring to be supplied with power therefrom. The wiring is not illustrated in FIGS. 1 and 2. Thus, the lawn mower 10 is constituted as a four-wheel, unmanned, electric autonomous operating vehicle (lawn-mowing vehicle) that is, for instance, about 600 millimeters long, 300 millimeters wide and 300 millimeters high.

A front end of the lawn mower 10 is installed with two, i.e., right and left magnetic sensors 34. The frame 12b is attached with a contact sensor 36. When the frame 12b comes off from the chassis 12a upon having contact with an obstacle and such, the contact sensor 36 outputs an ON signal.

A housing box is provided in the center or thereabout of the lawn mower 10 to house a board 40 on which an Electronic Control Unit (ECU; Controller) 42 including a microcomputer having a CPU, ROM, RAM, etc., is installed. The board 40 is also installed in the vicinity of the ECU 42 with a Yaw sensor (angular velocity sensor) 44 that produces an output or signal indicative of angular velocity (yaw rate) generated about a z-axis in the center of gravity of the lawn mower 10 and with a G sensor (acceleration sensor) 46 that produces an output or signal indicative of an acceleration G acting on the lawn mower 10 in the X, Y and Z (three-axis) directions.

A wheel speed sensor 50 is installed near the rear (driven) wheel 14b to produce an output or signal representing a wheel speed thereof A lift sensor 52 is installed between the chassis 12a and frame 12b to output an ON signal when the frame 12b is lifted from the chassis 12a by the operator or the like.

A current/voltage sensor 54 is installed at the battery 30 to produce an output or signal indicative of SOC (State Of Charge) of the battery 30. The lawn mower 10 is installed with a main switch 56 and emergency stop switch 60 to be manipulated by the operator.

The outputs of the foregoing magnetic sensors 34, contact sensor 36, Yaw sensor 44, G sensor 46, wheel speed sensor 50, lift sensor 52, current/voltage sensor 54, main switch 56 and emergency stop switch 60 are sent to the ECU 42.

The upper surface of the frame 12b of the lawn mower 10 is widely cut away and a display 62 is installed therein. The display 62 is connected to the ECU 42 to show a mode of the operating vehicle's status such as an operating mode in response to a command sent from the ECU 42.

Next, the explanation will be made on the operating area 70 where the lawn mower 10 is to run or move about. The operating area 70 is defined by an area wire (electric wire) 72 that is embedded (laid) along a border of land L. A charge ST (station) 74 is provided on the area wire 72. Note that the lawn mower 10 in FIG. 4 is exaggerated in size.

The charge ST 74 has a charging device (not shown) connected to a commercial power source and a charging terminal (not shown) that is connected to the charging device and connectable to the contact points 32a of the charging terminals 32 of the lawn mower 10. The charge ST 74 supplies alternating current to the area wire 72 to generate a magnetic field around the area wire 72.

The operation (lawn-mowing operation) of the thus-configured lawn mower 10 will be explained. The height of the blades 16 is manually adjusted by the operator through the blade height adjustment mechanism 22 in accordance with a growing condition of the lawn in the operating area 70. When the main switch 56 is switched on so that the ON signal is outputted, the ECU 42 starts to be operated and enters the operating mode to mow the lawn.

In the operating mode, the ECU 42 calculates a power supply control value with which a vehicle speed detected from the output of the wheel speed sensor 50 converges to a predetermined value and supplies the calculated value to the running motors 24 through a driver 240 to make the lawn mower 10 run or molve about. Further, the ECU 42 calculates a power supply control value with which rotational speeds of the blades 16 become a predetermined value and supplies the calculated value to the operating motor 20 through a driver 200 to operate the blades 16 to perform the operation.

To be more specific, in the operating mode, the ECU 42 makes the lawn mower 10 randomly run or move about to perform the operation within the operating area 70, and detects the intensity of the magnetic field generated around the area wire 72 through the magnetic sensors 34. When determining that the lawn mower 10 has moved out of the operating area 70 based on the outputs of the magnetic sensors 34, the ECU 42 changes a running direction detected based on the output of the Yaw sensor 44 by a predetermined angle so that the lawn mower 10 comes back to the inside of the operating area 70.

Since the right and left rear (driven) wheels 14b are configured so that they are driven by the running motors 24 to rotate in the normal and reverse directions independently or separately from each other, when the motors 24 are rotated in the normal direction at the same speed, the lawn mower 10 is run straight, whilst when they are rotated in the normal direction at different speeds, the lawn mower 10 is turned toward a side of lower rotational speed. When one of the motors 24 is rotated in the normal direction and the other is rotated in the reverse direction, since the right and left rear wheels 14b are rotated in the same direction as the associated motor's rotation, the lawn mower 10 is turned at the same position (which is so-called pivot turn).

Thus, in the operating mode, the ECU 42 makes the lawn mower 10 run about within the operating area 70 while changing the running direction thereof randomly whenever the lawn mower 10 reaches the area wire 72, and drives the blades 16 to perform the operation.

Further, in the operating mode, the ECU 42 monitors the SOC of the battery 30 based on the output of the current/voltage sensor 54 and when the remaining battery level is decreased to a predetermined level, makes the lawn mower 10 run along the area wire 72 to return to the charge ST 74 so that the charging terminals of the charging device are connected to the charging terminals 32 through the contact points 32a to charge the battery 30. It is called a return mode.

In the operating mode and return mode, when any of the contact sensor 36, lift sensor 52 and emergency stop switch 60 produces the ON signal, the ECU 42 stops the operating and running motors 20, 24 to stop the lawn mower's operation and running.

Based on the forgoing explanation as a premise, the connection between the operating motor 20 and blades 16 is now explained in detail.

Figure 5:
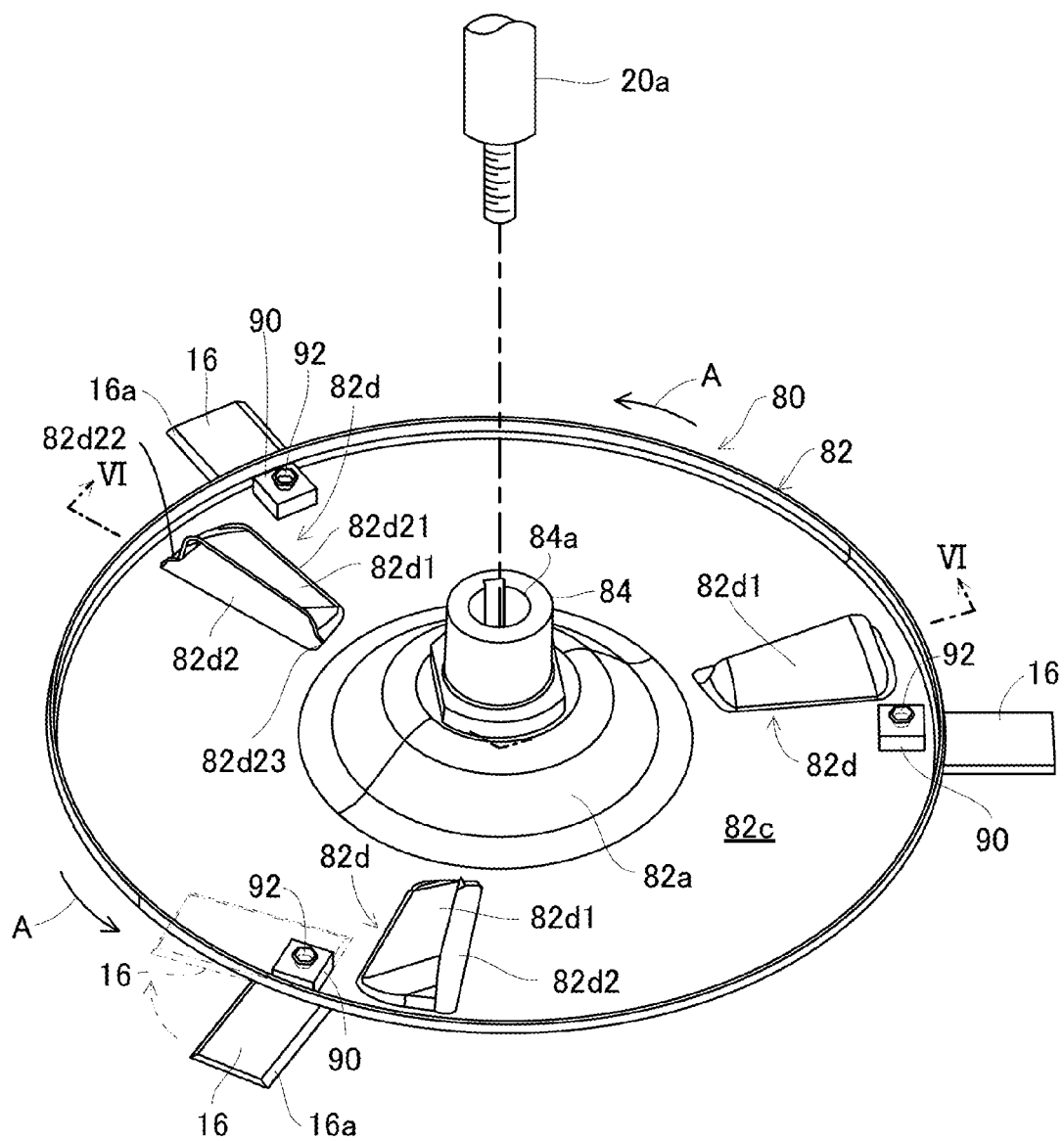
FIG. 5 is a perspective view showing blades shown in FIG. 1 and the surroundings thereof.
Figure 6:
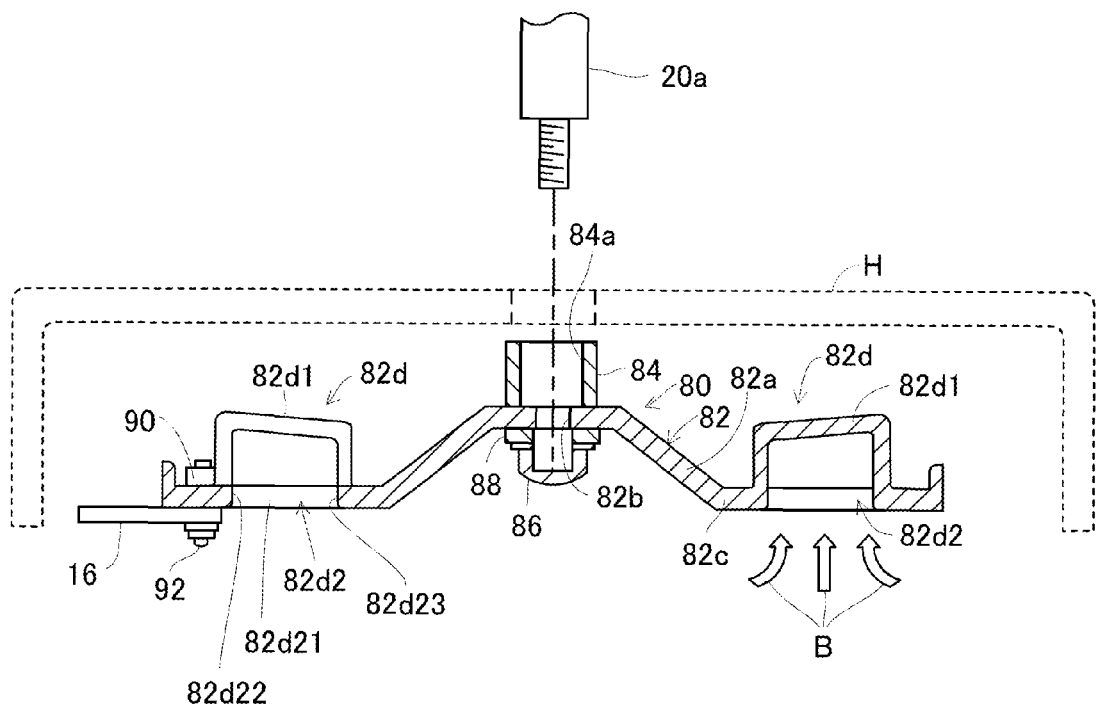
FIG. 6 is a cross-sectional view taken along a line VI-VI of FIG. 5.
Figure 7:
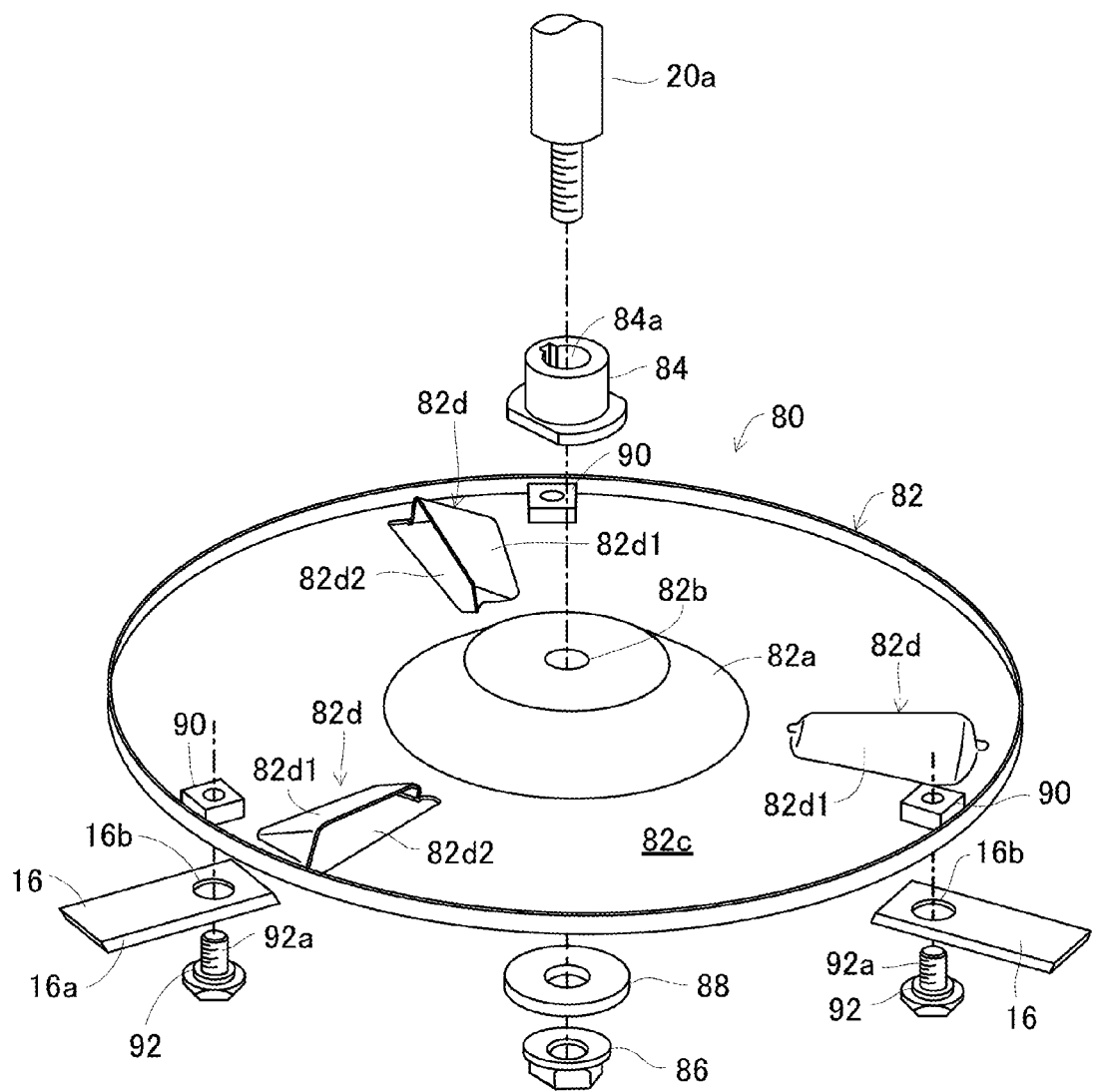
FIG. 7 is an exploded perspective view showing the blades and the surroundings shown in FIG. 5.

FIG. 5 is a perspective view showing the blades 16 shown in FIG. 1 and the surroundings thereof, FIG. 6 is a cross-sectional view taken along a line VI-VI of FIG. 5 and FIG. 7 is an exploded perspective view showing the blades 16 and the surroundings shown in FIG. 5.

As shown in FIGS. 5 to 7, a drive shaft 20a transmitting a rotational driving force of the operating motor 20 is connected with a plurality (i.e., three) of the blades 16 (one of which is not shown in FIG. 7) through a connecting member 80. The blades 16, connecting member 80, etc., are housed in (covered by) the blade housing H indicated by a dashed line in FIG. 6.

The connecting member 80 has a blade disk 82 having a disk-like shape and a holder 84 having a substantially cylindrical shape. The blade disk 82 has a diameter of 175 millimeters and made of, for instance, iron-based metal.

The blade disk 82 is formed at the center thereof with a truncated cone part 82a having a shape of substantially a truncated cone as clearly shown in FIG. 7, and the truncated cone part 82a is bored at the center thereof with an insertion hole 82b through which the drive shaft 20a of the operating motor 20 can be inserted. A flat part 82c of the blade disk 82 other than the truncated cone part 82a is integrally formed with a fan 82d.

The fan 82d includes a plurality (i.e., three) of fan blades 82d1 that are arranged so that each of their longitudinal directions lies substantially parallel to a radial direction of the blade disk 82, and substantially-rectangular openings 82d2 bored under the fan blades 82d1.

The fan blades 82d1 (and openings 82d2) are formed to correspond to the number of the blades 16, i.e., when the number of the blades 16 is three, the number of the fan blades 82d1 should be three accordingly. The three fan blades 82d1 and openings 82d2 are arranged at the blade disk 82 at equal intervals, i.e., at intervals of 120 degrees between each other.

Each of the fan blades 82d1 is formed so that the base thereof is connected to three sides out of four sides of the opening 82d2. The three sides of the opening 82d2 include a side 82d21 positioned on a rear side in the rotating direction (i.e., counterclockwise direction in FIG. 5 as indicated by an arrow A) of the blade disk 82, and two sides 82d22, 82d23 continued from the side 82d21. An elevation angle of the fan blade 82d1 (the angle relative to wind to be generated when the blade disk 82 is rotated) is appropriately designed in accordance with the capability (rotational speed) of the operating motor 20 and the like.

The holder 84 is bored with an insertion hole 84a through which the drive shaft 20a can be inserted. A lower end (in the drawing) of the drive shaft 20a is threaded as a male screw. Thus, when the drive shaft 20a is, as being positioned with a locator key (not shown), inserted into the insertion hole 84a of the holder 84 and the insertion hole 82b of the blade disk 82 and fastened with a nut 86, the blade disk 82 is fastened or fixed with the drive shaft 20a of the operating motor 20. A washer 88 is interposed between the blade disk 82 and nut 86.

The blade 16 has a substantially-rectangular shape and is formed with a cutting part at an edge 16a on the front side in the rotating direction A (under the condition where the blade 16 is attached to the blade disk 82). The blade 16 is made of, for instance, a tool-steel material.

As illustrated, the three blades 16 are attached at the circumference (outer periphery) of the blade disk 82 at equal intervals (at intervals of 120 degrees between each other). To be more specific, the flat part 82c of the blade disk 82 is provided in the vicinity of its circumference and adjacent to the respective fan blades 82d1 of the fan 82d with nut portions 90, in other words, each of the nut portions 90 is installed at a position spaced apart by a predetermined distance from the connecting portion of the fan blade 82d1 with the one side 82d21 of the opening 82d2 (i.e., the base of the fan blade 82d1) on a rear side in the rotating direction A.

The blade 16 is bored with a bolt hole 16b of larger in radius than a screw portion 92a of a bolt 92. Consequently, when the bolt 92 is inserted into the bolt hole 16b of the blade 16 and the nut portion 90 of the blade disk 82 and fastened, the blade 16 is attached to the blade disk 82 to be able to swing (rotate) relative thereto.

Owing to the above configuration, when the blades 16 and connecting member 80 are rotated by the drive shaft 20a of the operating motor 20 in the rotating direction A, a centrifugal force is generated by the rotation and the blades 16 are rotated while projecting outward in the radial direction accordingly, thereby mowing the lawn. In addition, when the connecting member 80 is rotated, negative pressure is generated at the fan 82d (more precisely, negative pressure acting as indicated by arrows B in FIG. 6 is generated under the fan blades 82d1 and openings 82d2) so that a resulting stream of air works to lift up lying grass and it helps the blades 16 cut the grass.

Sometimes the blade 16 may contact a stone or the like when mowing the lawn. In that case, since the blade 16 is swung (displaced) about the bolt hole 16b through which the bolt 92 is inserted (i.e., the blade 16 is slid under the blade disk 82) as shown by an imaginary line in FIG. 5, the blade 16 can avoid receiving excessive force.

As stated above, the embodiment is configured to have a lawn mower (10) for mowing lawns on a ground having a drive shaft (20a) adapted to transmit a rotational driving force of a prime mover (operating motor 20), a blade (16) and a connecting member (80; blade disk 82) adapted to connect the blade with the drive shaft, characterized in that: a fan (82d) is integrally formed at the connecting member. More specifically, the drive shaft (20a), blade (16) and connecting member (80) are mounted on an unmanned autonomous operating vehicle (10) adapted to be controlled to run about in an operating area of the ground defined by an area wire (72) to perform an operation using the blade with magnetic sensors (34) installed in a vehicle body (12) detecting intensity of a magnetic field of the area wire.

With this, when the blades 16 and connecting member 80 are rotated by the rotation of the drive shaft 20a, negative pressure is generated through the fan 82d formed at the connecting member 80 (blade disk 82) so that a resulting stream of air works to lift up the lying grass and it helps the blades 16 cut the grass, thereby improving the mowing performance. Further, it becomes possible to hold (float) the cut grass in the interior of the blade housing H that houses the blades 16 and connecting member 80 and further cut the held grass by the blades 16, thereby improving also mulching performance.

In the lawn mower, the connecting member has a disk-like shape and the blade (16) comprises a plurality of the blades that are attached at a circumference of the connecting member. With this, it becomes possible to surely mow the lawn by a plurality of the blades 16 attached to the connecting member 80, thereby further improving the mowing performance and mulching performance.

In the lawn mower, the blade (16) has a substantially rectangular shape. With this, the structure of the blade 16 can be simple.

In the lawn mower, the blade (16) is attached to the connecting member to be able to swing relative to the connecting member. With this, it becomes possible to make the blades 16 rotate together with the connecting member 80 while making them project outward in the radial direction by the aid of the centrifugal force generated by the rotation of the connecting member 80, thereby mowing the lawn. Further, even when the blade 16 contacts a stone or the like during the mowing-lawn operation, the blade 16 is swung so that it can avoid receiving excessive force and being damaged.

Figure 8:
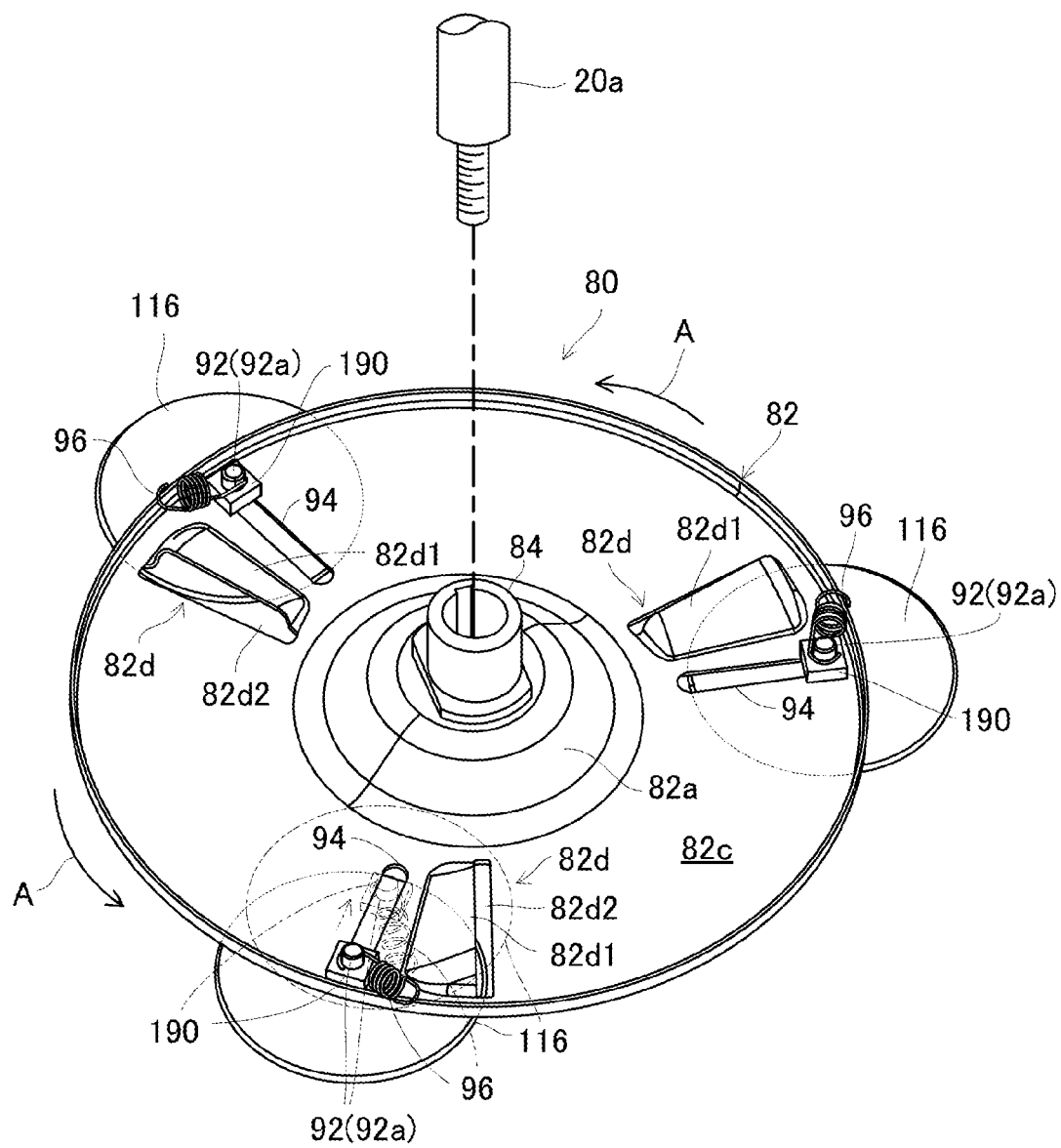
FIG. 8 is a perspective view similar to FIG. 5, but showing blades of a lawn mower according to a second embodiment of the invention and the surroundings thereof

A lawn mower according to a second embodiment will be next explained. The explanation of the second embodiment will focus on the points of difference from the first embodiment. In the second embodiment, the blade that has a substantially-rectangular shape in the first embodiment is configured to have a substantially disk-like shape. FIG. 8 is a perspective view similar to FIG. 5, but showing blades of the lawn mower according to the second embodiment and the surroundings thereof.

As shown in FIG. 8, each of the blades 116 has a substantially disk-like shape and is formed with a cutting part at the periphery. The blade(s) 116 of the lawn mower 10 according to the second embodiment will be hereinafter called a "circular blade(s)" to distinguish it from the blade(s) 16 in the first embodiment.

Similarly to the first embodiment, the three circular blades 116 are attached at the circumference (outer periphery) of the blade disk 82 at equal intervals (at intervals of 120 degrees between each other). Further, the circular blades 116 are configured to be movable relative to the blade disk 82 in a radial direction of the blade disk 82.

Specifically, the flat part 82c of the blade disk 82 is bored with long holes 94 each of which extends along the connecting portion of the fan blade 82d1 with the one side 82d21 of the opening 82d2 (the base of the fan blade 82d1). The width of the long hole 94 (the length in a direction orthogonal to a longitudinal direction thereof) is set to a value that enables the screw portion 92a of the bolt 92 to move (slide) in the long hole 94.

Nut portions 190 are provided separately from the blade disk 82. A bolt hole (not shown in FIG. 8) similar to that in the first embodiment is bored in the center of the circular blade 116. Consequently, when the bolt 92 is inserted into the bolt hole of the circular blade 116 and the long hole 94 and nut portion 190 of the blade disk 82 and fastened, the circular blade 116 is attached to the blade disk 82. Since, as mentioned in the foregoing, the bolt hole of the circular blade 116 is set larger in radius than the screw portion 92a of the bolt 92, the circular blade 116 is rotatable about the bolt hole relative to the blade disk 82.

The screw portion 92a of the bolt 92 is engaged with one end of a spring member (helical extension spring; elastic body) 96 and the other end of the spring member 96 is fixed at an appropriate position of the circumference (outer periphery) of the blade disk 82. Consequently, the bolt 92, the circular blade 116 through which the bolt 92 is inserted and the nut portion 190 are urged by the spring member 96 toward the periphery of the blade disk 82.

Owing to the above configuration, when, for instance, the circular blade 116 contacts a stone or the like during the mowing-lawn operation so that a force is applied, since the circular blade 116 is pressed toward the center of the blade disk 82 as indicated by imaginary lines in FIG. 8, the bolt 92 is moved (slid) in the long hole 94 against the urging force of the spring member 96 toward the center of the blade disk 82, i.e., the circular blade 116 is moved relative to the blade disk 82 toward the center thereof in the radial direction thereof As a result, even when the circular blade 116 contacts a stone or the like, since the circular blade 116 is displaced relative to the blade disk 82, similarly to the first embodiment, the circular blade 116 can avoid receiving excessive force.

Thus, in the second embodiment, the blade (116) has a substantially disk-like shape. With this, it becomes possible to form a cutting part around the entire circumference of the circular blade 116, i.e., form the part used for cutting the lawn not at a limited portion of the blade but over the entire circumference, thereby improving durability (extending the life) of the circular blade 116. Further, since the circular blade 116 is rotated to mow the lawn with its circular arc portion, it becomes possible to further improve the mowing performance and mulching performance.

In the lawn mower, the connecting member (80) has a disk-like shape and the blade is attached to the connecting member to be movable relative to the connecting member in a radial direction of the connecting member. With this, even when, for instance, the circular blade 116 contacts a stone or the like during the mowing-lawn operation, since the circular blade 116 having the substantially disk-like shape is moved relative to the connecting member 80 (blade disk 82) in the radial direction of the connecting member 80, the circular blade 116 can avoid receiving excessive force and being damaged.

The remaining configuration and effects are the same as those in the first embodiment and will not be explained.

As stated above, the first and second embodiments are configured to have a lawn mower (10) for mowing lawns on a ground having a drive shaft (20a) adapted to transmit a rotational driving force of a prime mover (operating motor 20), a blade (16, 116) and a connecting member (80; blade disk 82) adapted to connect the blade with the drive shaft, characterized in that: a fan (82d) is integrally formed at the connecting member.

In the lawn mower, the connecting member has a disk-like shape and the blade comprises a plurality of the blades that are attached at a circumference of the connecting member, the blade has a substantially rectangular shape, and the blade is attached to the connecting member to be able to swing relative to the connecting member.

In the lawn mower, the drive shaft (20a), blade (16) and connecting member (80) are mounted on an operating vehicle body (12) adapted to be controlled to run about in an operating area to perform an operation using the blade.

The second embodiment is configured to have the lawn mower, wherein the blade has a substantially disk-like shape, and the connecting member has a disk-like shape and the blade is attached to the connecting member to be movable relative to the connecting member in a radial direction of the connecting member.

It should be noted that, in the foregoing, although the electric motor is applied as the prime mover, it may be an internal combustion engine or another prime mover instead. Further, although the size of the lawn mower 10 and blade disk 82, materials of the above components, etc., are indicated with specific values or names, they are only examples and not limited thereto.

Japanese Patent Application No. 2012-027632, filed on Feb. 10, 2012 is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A lawn mower for mowing lawns on a ground having a drive shaft adapted to transmit a rotational driving force of a prime mover, a blade and a connecting member adapted to connect the blade with the drive shaft, wherein:

a fan is integrally formed at the connecting member, the fan including a fan blade disposed above a substantially rectangular-shaped opening defined in the connecting member by four side edges, a base of the fan blade being connected to the connecting member at three of the four side edges defining the opening, the connecting member has a disk-like shape, and a long hole is bored in the connecting member, the blade has a substantially disk-like shape, a bolt hole being bored in a center of the blade, the blade being attached to the connecting member using a nut portion and a bolt inserted into the long hole and the bolt hole so that the blade is movable relative to the connecting member in a radial direction of the connecting member along the long hole, the long hole being extended along the base of the fan blade and disposed beside the opening, and a spring member is provided at the connecting member, one end of the spring member being engaged with the bolt and another end being fixed on an outer periphery of the connecting member, the spring member biasing the bolt and the blade toward a periphery of the connecting member along the long hole.

2. The lawn mower according to claim 1, wherein the blade consists of a plurality of blades that are attached at a circumference of the connecting member.

3. The lawn mower according to claim 1, wherein the drive shaft, blade and connecting member are mounted on an operating vehicle body adapted to be controlled to run about in an operating area to perform an operation using the blade.

4. The lawn mower according to claim 1, wherein the long hole is elongated in a radial direction of the connecting member.

5. The lawn mower according to claim 4, wherein the other end of the spring member is fixed at a first position on the outer periphery of the connecting member which is spaced from a second position on the outer periphery of the connecting member which intersects with a center line of the long hole which extends in the radial direction along a radial length of the long hole through a center of the long hole.

* * * * *